United States Patent [19]

Maeda

[11] Patent Number: 4,827,886
[45] Date of Patent: May 9, 1989

[54] CRANK ANGLE DETECTING SYSTEM FOR AN INTERNAL COMBUSTION ENGINE

[75] Inventor: Satoshi Maeda, Tokyo, Japan

[73] Assignee: Fuji Jukogyo Kabushiki Kaisha, Tokyo, Japan

[21] Appl. No.: 132,276

[22] Filed: Dec. 14, 1987

[30] Foreign Application Priority Data

Dec. 19, 1986 [JP] Japan .................... 61-303048

[51] Int. Cl.$^4$ .................... F02P 9/00; F02D 5/02
[52] U.S. Cl. .................... 123/414; 123/612; 123/643
[58] Field of Search ............. 123/414, 416, 612, 616, 123/643, 644, 476, 612, 643; 73/117.3, 116; 324/173, 174, 179

[56] References Cited

U.S. PATENT DOCUMENTS

| | | | |
|---|---|---|---|
| 4,365,602 | 12/1982 | Stiller et al. | 123/414 |
| 4,519,362 | 5/1985 | Arakawa et al. | 123/414 |
| 4,553,427 | 11/1985 | Kuraoka et al. | 123/414 |
| 4,656,993 | 4/1987 | Yuzawa et al. | 123/414 |
| 4,664,082 | 5/1987 | Suzuki | 123/414 |
| 4,676,212 | 6/1987 | Kashimura et al. | 123/416 |

Primary Examiner—Raymond A. Nelli
Attorney, Agent, or Firm—Martin A. Farber

[57] ABSTRACT

A pulse generator disk is secured to a crankshaft of an engine. The disk has notches representing a compression top dead center of each cylinder. A first magnetic pickup is provided for producing a first output signal in accordance with the notches. A rotary member is secured to a camshaft of the engine. The member has toothed portions comprising projections provided at positions corresponding to respective cylinders. The number of the projections in each toothed portion is set to represent a corresponding cylinder. A second magnetic pickup is provided for producing a second output signal in accordance with the projections. A control system is provided to respond to the second output signal determining the number of the projections to produce a cylinder designating signal, and to respond to the first output signal after the cylinder designating signal to produce a crank angle signal.

6 Claims, 7 Drawing Sheets

CRANK ANGLE DETECTING SYSTEM FOR AN INTERNAL COMBUSTION ENGINE

BACKGROUND OF THE INVENTION

The present invention relates to a crank angle detecting system for an internal combustion engine for vehicles. The detected crank angle is used for controlling the fuel injection timing and ignition timing of the engine.

Heretofore various methods for sensing the crank angle have been proposed and used. Japanese Patent Application Laid-Open No. 55-66620 discloses a system in which a crankshaft is provided with a pulley having V-shaped notches on the periphery thereof. The crank angle is determined by sensing the position of the notch. Further, as another method, a system for detecting the crank angle dependent on the position of a camshaft is used.

However, in case of a multi-cylinder engine, the former system can not discriminate the crank angle for each cylinder. As an example of the latter system, the crank angle is detected by a rotor plate having slits. The rotor plate is provided in a distributor or secured to the camshaft, and an optical sensing system comprising a light emitting diode and a photo diode is provided for sensing the position of the slits. Such a system entails high manufacturing cost. Furthermore, a timing belt for driving the camshaft may vibrate or deteriorate with time, and will extend or contract by thermal expansion during operation. Accordingly, it is difficult to detect the crank angle accurately.

SUMMARY OF THE INVENTION

The object of the present invention is to provide a crank angle detecting system for an automotive engine which may detect the crank angle with accuracy and can discriminate the crank angle for each cylinder of the engine.

The other objects and features of this invention will become understood from the following description with reference to the accompanying drawings.

DETAILED DESCRIPTION OF THE PREFERRED EMBODIMENTS

Figure 1:
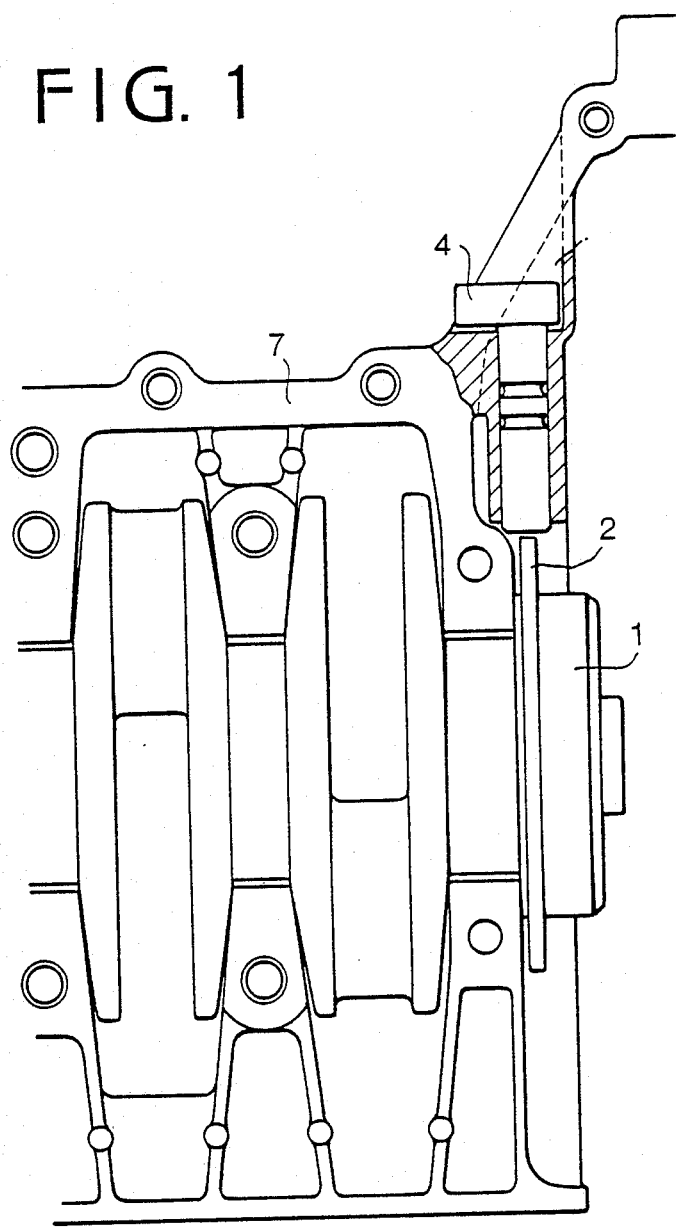
FIG. 1 is a side view showing a part of a crankshaft.
Figure 2:
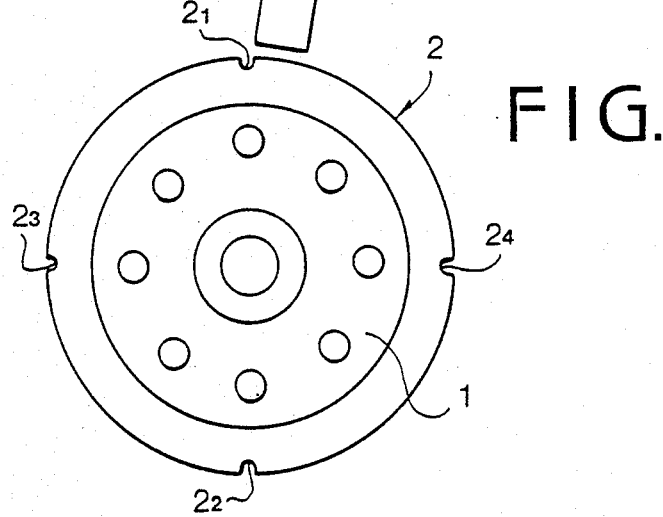
FIG. 2 is a front view of the crankshaft.

Referring to FIGS. 1 and 2, a crankshaft 1 rotatably mounted in a crankshaft 7 has a pulse generator disk 2 secured to a rear end thereof. The pulse generator disk 2 has a plurality of notches, for example, in case of the four-cylinder engine, four notches $2_1$, $2_2$, $2_3$, $2_4$ formed on an outer periphery thereof at equal angular intervals (90 degrees). Notches $2_1$, $2_2$, $2_3$, $2_4$ represents compression top dead centers of No.1 to No.4 cylinders of the engine, respectively. A first magnetic pickup 4 is mounted on the crankcase 7 adjacent the disk 2 for detecting the notches.

Figure 3:
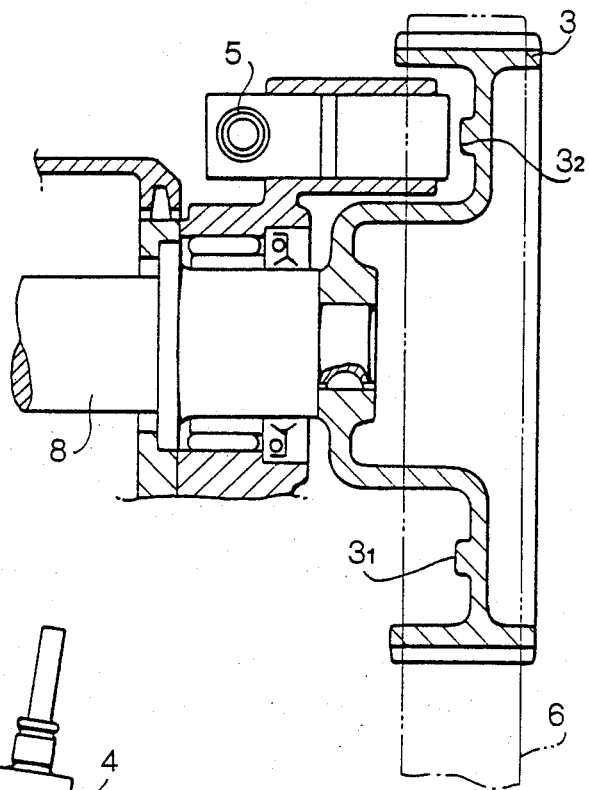
FIG. 3 is a longitudinal sectional view showing a part of a camshaft.
Figure 4:
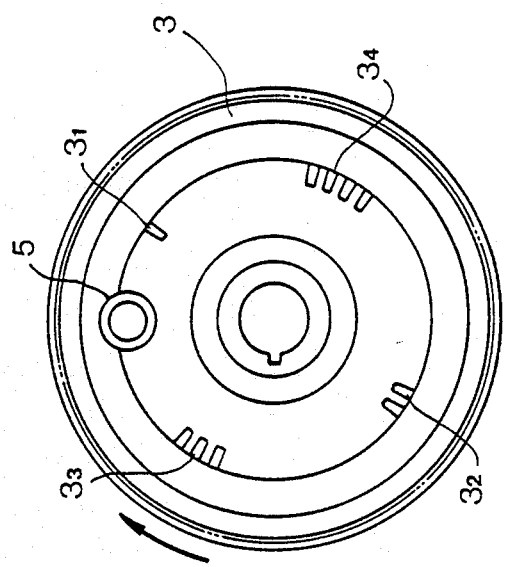
FIG. 4 is a front view of a cam pulley mounted on the camshaft.

Referring to FIGS. 3 and 4, a camshaft pulley 3 secured to a camshaft 8 is connected to a crankshaft pulley (not shown) of the crankshaft 1 through a timing belt 6. The camshaft pulley 3 rotates once when the pulse generator disk 2 rotates twice. The camshaft pulley 3 is provided with toothed portions $3_1$, $3_2$, $3_3$, $3_4$ formed on a side thereof. As shown in FIG. 4, the toothed portion $3_1$ has one projection, toothed portion $3_2$ has two projections, portion $3_3$ three projections, and portion $3_4$ four projections. Therefore, the toothed portions $3_1$ to $3_4$ represent No.1 to No.4 cylinders, respectively. Toothed portions $3_1$ to $3_4$ are disposed at regular angular intervals on the side of the pulley 3 and positioned according to the firing order of the engine. A second magnetic pickup 5 is provided adjacent the side of the camshaft pulley 3 for detecting the toothed portions.

Figure 5:
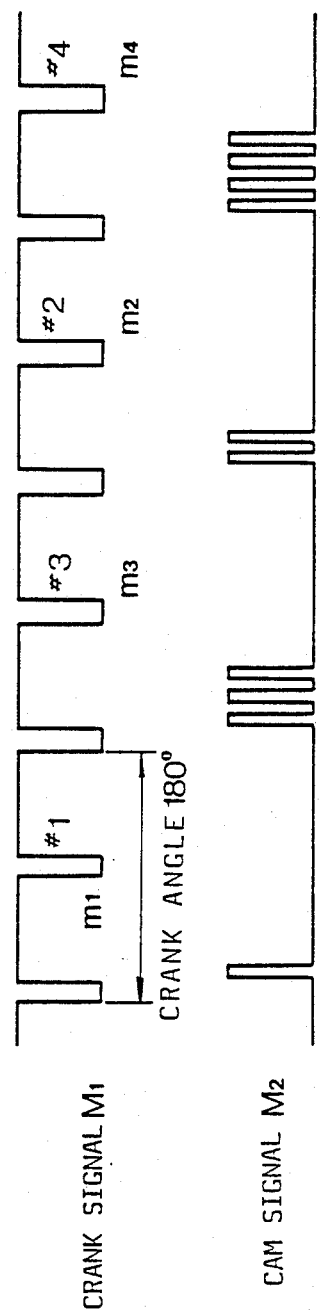
FIG. 5 shows waveforms showing a relationship between a crank signal and a cam signal.

When the pulse generator disk 2 rotates, the first magnetic pickup 4 detects the positions of notches $2_1$ to $2_4$ and produces crank signals M1 in the form of pulses as shown in FIG. 5. When the camshaft pulley 3 is rotated by the crankshaft 1 through the timing belt 6, second magnetic pickup 5 detects toothed portions $3_1$ to $3_4$ to produce cam signals M2 in the form of pulses.

The number of the cylinder and a top dead center of the corresponding cylinder are discriminated by the combination of the crank signal M1 and the cam signal M2. That is to say, a crank angle signal m1 after the one-pulse signal of the cam signal M2 represents the top dead center of the No.1 cylinder, a crank angle signal m3 after the three-pulse signal represents a top dead center of the No.3 cylinder. Similarly, a crank angle signal m2 represents the No.2 cylinder and a crank angle signal m4 represents the No.4 cylinder.

Figure 6:
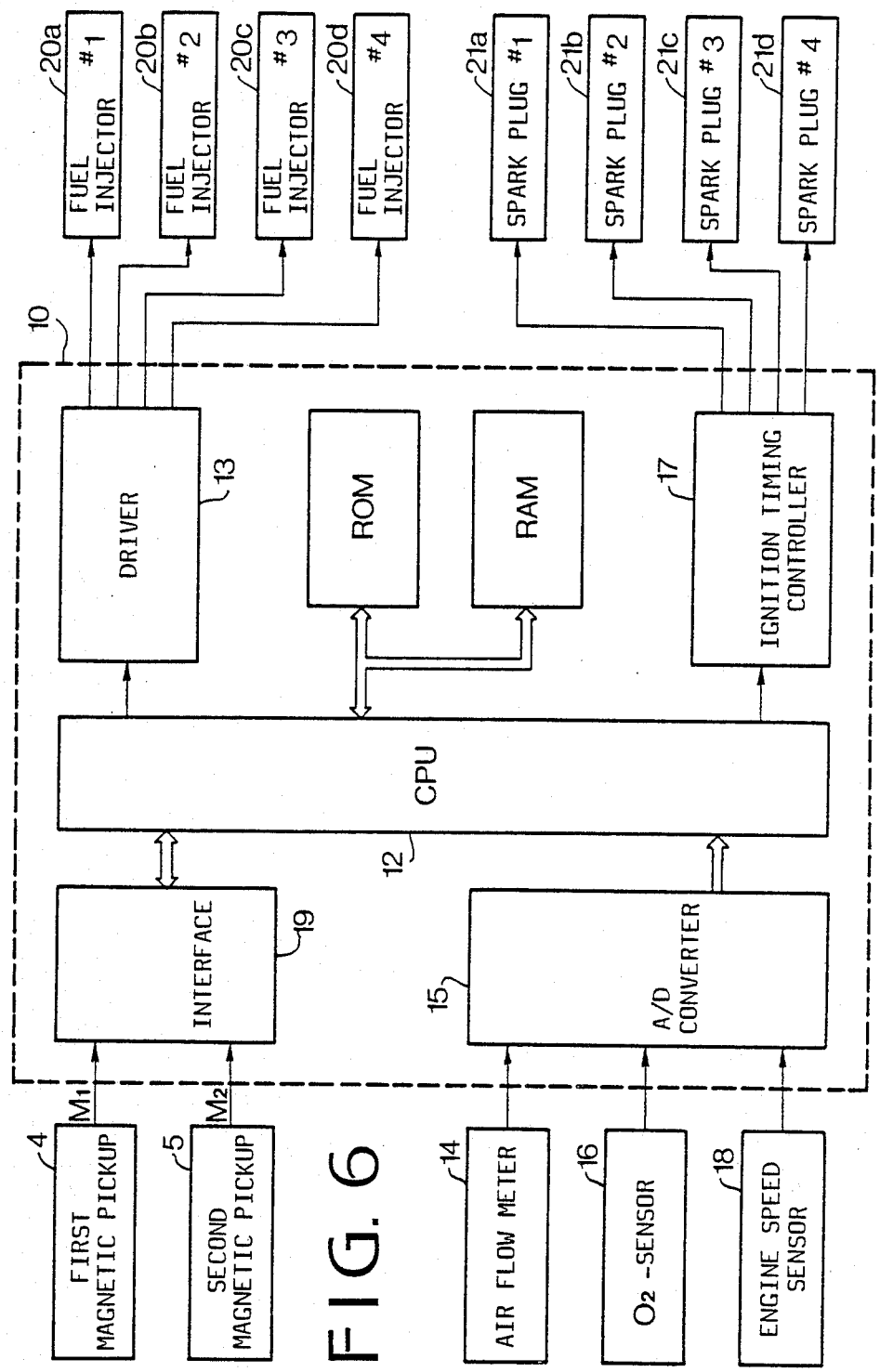
FIG. 6 is a block diagram of a control unit used in a system according to the present invention.

Referring to FIG. 6, a control unit 10 is provided for controlling fuel injection timing and ignition timing. The control unit 10 comprises a CPU 12 having a ROM and a RAM. The crank signal M1 of the first magnetic pickup 4 and the cam signal M2 of the second magnetic pickup 5 are applied to an interface 19 and an output signal thereof is applied to CPU 12 for determining the timing of the compression top dead center of each cylinder. The system has an air flow meter 14 for measuring air flow passing in an intake passage of the engine, an $O_2$-sensor for detecting oxygen concentration in exhaust gases, and an engine speed sensor 18. Signals of the air flow meter 14, $O_2$-sensor 16, and engine speed sensor 18 are applied to CPU 12 through an A/D converter 15. CPU 12 calculates a fuel injection pulse width and fuel injection timing to be supplied to the cylinders in accordance with input signals dependent on operating conditions of the engine, and produces a control signal which is applied to fuel injectors 20a to 20d through a driver 13. Further, the ignition timing is calculated based on the crank signal M1 and cam signal M2 and a timing signal is sent to an ignition timing controller 17. The controller 17 produces a signal in response to the timing signal of CPU 12 for energizing ignition coils of spark plugs 21a to 21d to No.1 to No.4 cylinders.

Figure 7A:
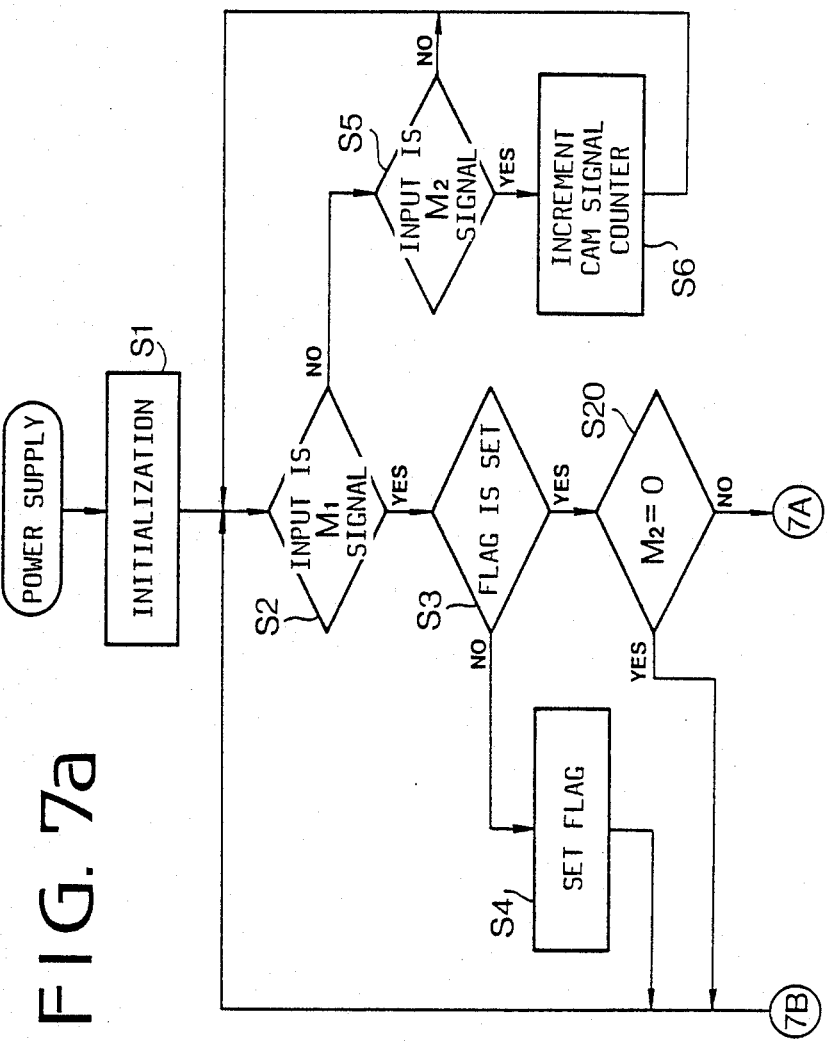
FIGS. 7a and 7b are a flow chart showing the operation of the control unit.
Figure 7B:
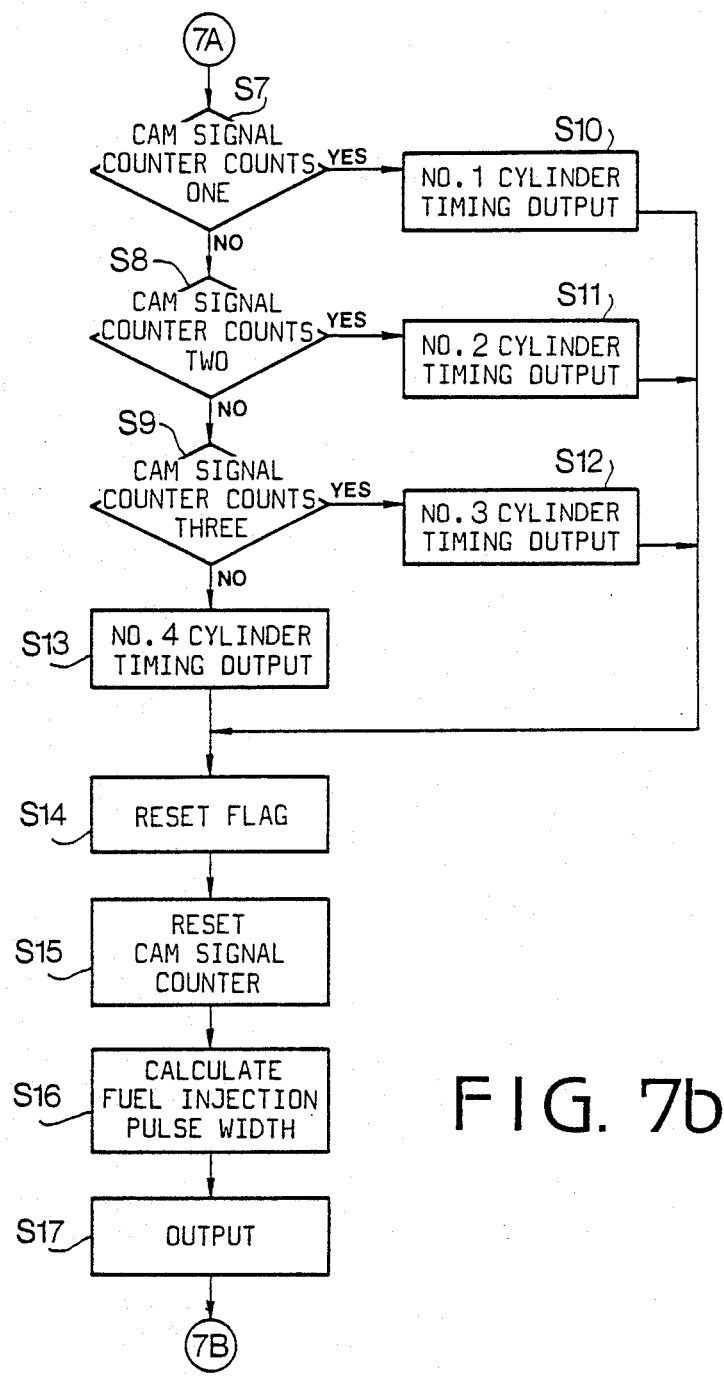

The operation of the control unit will be described hereinafter with reference to the flow chart of FIGS. 7a and 7b.

When the power is supplied to CPU 12, ports and registers are initialized at a step S1. Thus, a timing signal processing operation of the present invention starts. At a step S2, it is determined whether an input signal is a crank signal M1 from the first magnetic pickup 4 or not. If the crank signal M1 is determined, the program proceeds to a step S3, where it is determined whether a flag F exists or not. If no flag is set, a flag F is set at a step S4, and the program returns to step S2. When a next signal is also a crank signal M1, the program returns from a step S20. If the next signal is not crank signal M1, the program proceeds to a step S5. At the step S5, when it is determined that the input signal is the cam signal M2 from the second magnetic pickup 5, the program goes to a step S6, where a cam signal counter (not shown) provided in the system is increased by one. Then, the program returns to the step S2 for determining a further next input signal. Thus, the operations at steps S2, S5 and S6 for counting the number of pulses of the signal M2 by the cam signal counter are repeated for discriminating the cylinders.

It is determined that the crank signal M1 is one of the crank angle signals m1 to m4 representing the top dead center of the corresponding cylinder at the step 20 when crank signal M1 is inputted, after the cam signal M2 was counted by the cam counter and the corresponding cylinder was discriminated.

The program selectively proceeds from step S20 to a steps S7 and S10, or steps S7, S8, S11, or S7, S8, S9, S12 or S7, S8, S9, S13. At steps S7, S8 and S9, the count output of the counter is read to discriminate the cylinders. At steps S10 to S13, an ignition timing signal for the corresponding cylinder is produced. For example, when it is determined that the count is two at the step S8, the program proceeds to the step S11, where an ignition timing signal for No.2 cylinder is generated.

Namely, the crank angle signal of the corresponding cylinder was inputted, and the ignition timing signal for the corresponding cylinder is generated.

The flag F is reset at a stop S14 and the cam signal counter is reset at a step S15. The appropriate fuel injection pulse width is calculated at a step S16. A fuel injection pulse width signal dependent on the calculated width is produced at a step S17. Then the program returns to the step S2, and the program from steps S2 to S17 is repeated.

Figure 8:
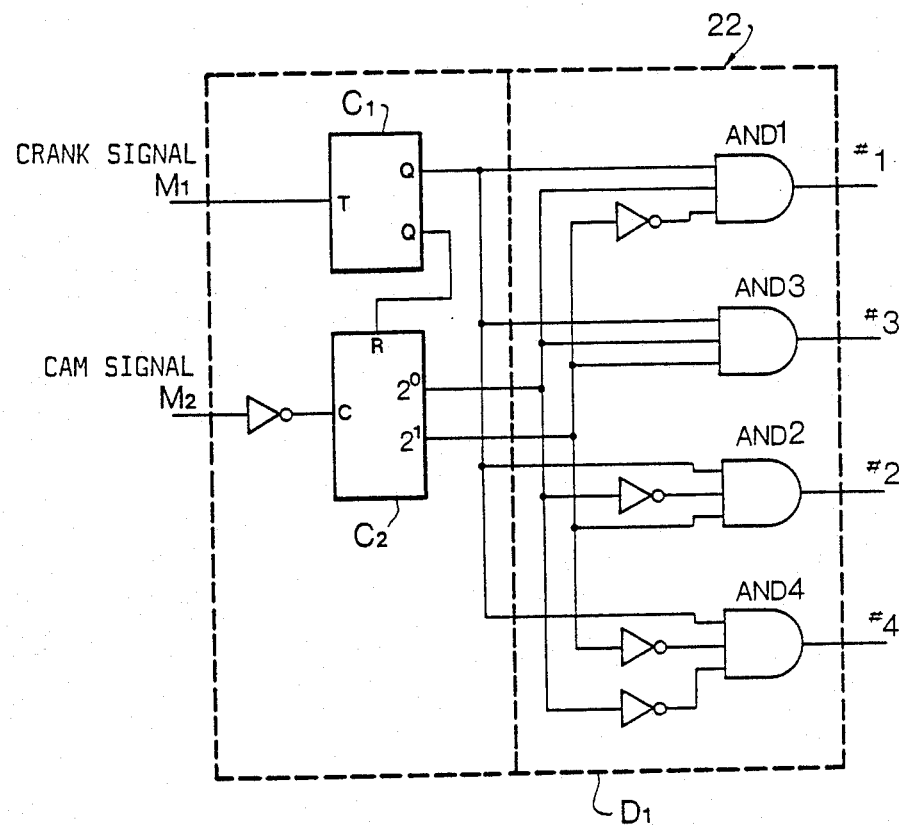
FIG. 8 is a logic circuit showing another embodiment of the present invention.

FIG. 8 shows another embodiment of the control unit which is employed with a logic circuit. A control unit 22 comprises a T-flip-flop C1, a two-bit counter C2, and a decoder D1 having AND gates AND1 to AND4 which correspond to the No.1 to No.4 cylinders. The T-flip-flop C1 is supplied with the crank signal M1 and the counter C2 is supplied with the cam signal M2. When the crank signal M1 is applied to the T-flip-flop C1, the T-flip-flop C1 produces a signal from an output Q which is applied to a reset terminal of the two-bit counter C2. The counter C2 is reset for counting the cam signal M2. When the cam signal M2 is applied, the counter C2 counts the number of pulses. The counter C2 produces output signals from output terminals $2^0$ and $2^1$, and the output signals are applied to the decoder D1. An output at a $\bar{Q}$ terminal of the T-flip-flop C1 is applied to the decoder D1. Thus, AND gates AND1 to AND4 produce output signals at timings for corresponding cylinders, respectively.

In the system of the present invention, since the timing that is the crank angle signal is detected by the combination of the crank signal and camshaft signal, an accurate detection can be obtained, with the discrimination of the cylinders.

While the presently preferred embodiments of the present invention have been shown and described, it is to be understood that this disclosure is for the purpose of illustration and that various changes and modifications may be made without departing from the spirit and scope of the invention as set forth in the appended claims.

What is claimed is:

1. A crank angle detecting system for an internal combustion engine having a plurality of cylinders firing in a predetermined cylinder number order, a crankshaft, and a camshaft operatively connected to the crankshaft and rotating once when the crankshaft rotates twice, the system comprising first decision means secured to the crankshaft having crankshaft marks, each mark representing a compression top dead center of a cylinder, crankshaft mark sensing means provided adjacent to the first decision means for detecting the crankshaft marks for producing a crankshaft signal when each crankshaft mark is detected, second decision means secured to the camshaft having camshaft marks representing said cylinders, respectively, camshaft mark sensing means provided adjacent to the second decision means for detecting the camshaft marks and for producing a cylinder signal when each respective camshaft mark is detected, detecting means for detecting the number of the cylinder detected responsive to the cylinder signal and for producing a corresponding signal corresponding with the number of the cylinder, and discriminating means for discriminating a compression top dead center of the detected cylinder responsive to the crankshaft signal occurring after said corresponding signal so as to accurately detect the crank angle corresponding to the number of the cylinder of the plurality of cylinders.

2. The system according to claim 1, wherein
said first decision means is a pulse generator disk and said crankshaft marks are notches in said disk, and
said crankshaft mark sensing means is a magnetic pickup.

3. The system according to claim 1, wherein
said camshaft mark sensing means detects the camshaft marks and produces a different said cylinder signal for each respective camshaft mark detected, said different cylinder signal representing the number of the cylinder corresponding to the detected camshaft mark.

4. The system according to claim 1, wherein
respective of said camshaft marks represent respective of the numbers of the cylinders and are disposed on said second decision means at uniform angular intervals and positioned in the predetermined cylinder number firing order.

5. The system according to claim 1, wherein
the second decision means comprises a rotary member secured to the camshaft of said engine and having toothed portions comprising projections constituting said camshaft marks provided at positions on the rotary member corresponding to the respective cylinders, the number of said projections in each toothed portion is set to represent a corresponding cylinder, and
said camshaft mark sensing means comprises a magnetic pickup for producing the cylinder signal in accordance with said projections.

6. The system according to claim 5 wherein said rotary member is a cam pulley secured to said camshaft.

* * * * *